(12) United States Patent
Obinata et al.

(10) Patent No.: US 11,237,443 B2
(45) Date of Patent: Feb. 1, 2022

(54) DISPLAY DEVICE

(71) Applicant: Japan Display Inc., Tokyo (JP)

(72) Inventors: Naoyuki Obinata, Tokyo (JP); Daichi Hosokawa, Tokyo (JP); Masakatsu Kitani, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/113,808

(22) Filed: Dec. 7, 2020

(65) Prior Publication Data

US 2021/0088862 A1 Mar. 25, 2021

Related U.S. Application Data

(63) Continuation of application No. 16/363,162, filed on Mar. 25, 2019, now Pat. No. 10,890,817.

(30) Foreign Application Priority Data

Mar. 29, 2018 (JP) .............................. JP2018-065081

(51) Int. Cl.
| | |
|---|---|
| *G02F 1/1362* | (2006.01) |
| *G02F 1/1343* | (2006.01) |
| *G02F 1/1333* | (2006.01) |
| *G06F 3/041* | (2006.01) |

(52) U.S. Cl.
CPC .... *G02F 1/136286* (2013.01); *G02F 1/13338* (2013.01); *G02F 1/134336* (2013.01); *G06F 3/0412* (2013.01); *G06F 3/0416* (2013.01)

(58) Field of Classification Search
CPC ........... G02F 1/136286; G02F 1/13338; G02F 1/134336; G06F 3/0412; G06F 3/0416; G06F 3/0443; G06F 2203/04103; G06F 2203/04111

USPC ........................................... 345/173; 349/139
See application file for complete search history.

(56) References Cited

U.S. PATENT DOCUMENTS

| 9,274,653 | B2 | 3/2016 | Ishizaki | |
|---|---|---|---|---|
| 9,898,125 | B2 | 2/2018 | Yang | |
| 10,067,603 | B1 | 9/2018 | Hsieh | |
| 10,635,215 | B2 | 4/2020 | Aoki | |
| 2015/0062451 | A1* | 3/2015 | Ono ...................... | G06F 3/0412 |
| | | | | 349/12 |
| 2017/0003791 | A1 | 1/2017 | Berget | |
| 2017/0003792 | A1 | 1/2017 | Berget | |
| 2017/0153746 | A1* | 6/2017 | Ahn ..................... | G06F 3/04166 |

(Continued)

FOREIGN PATENT DOCUMENTS

JP 2017-102454 6/2017

*Primary Examiner* — Tom V Sheng
(74) *Attorney, Agent, or Firm* — Oblon, McClelland, Maier & Neustadt, L.L.P.

(57) ABSTRACT

According to one embodiment, a display device includes a first electrode, a second electrode, a first wiring electrically connected to the first electrode, a second wiring electrically connected to the second electrode, and a controller electrically connected to the first wiring and the second wiring, wherein the first electrode and the second electrode are located in a display area, the first electrode is connected to the first wiring in a position away from the controller than the second electrode, the second electrode is connected to the second wiring in a position closer to the controller than the first electrode, and a number of the first wiring being greater than a number of the second wiring.

7 Claims, 12 Drawing Sheets

(56) References Cited

U.S. PATENT DOCUMENTS

| | | |
|---|---|---|
| 2017/0242531 A1* | 8/2017 | Soya .................. G06F 3/04166 |
| 2017/0344186 A1 | 11/2017 | Na |
| 2018/0348918 A1 | 12/2018 | Rhe |
| 2019/0179461 A1* | 6/2019 | Baek ..................... G06F 3/0412 |
| 2019/0278144 A1* | 9/2019 | Hosokawa .......... G06F 3/04164 |

* cited by examiner

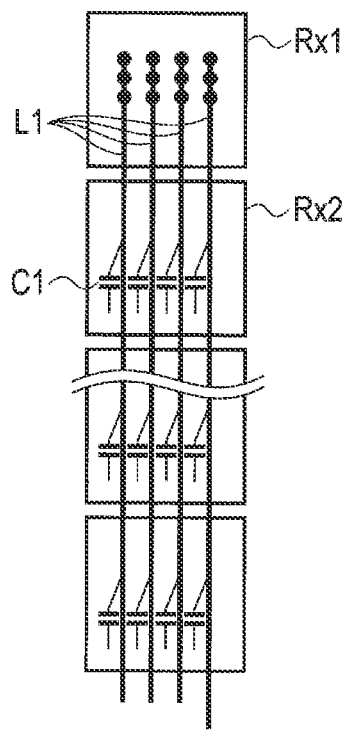
F I G. 11
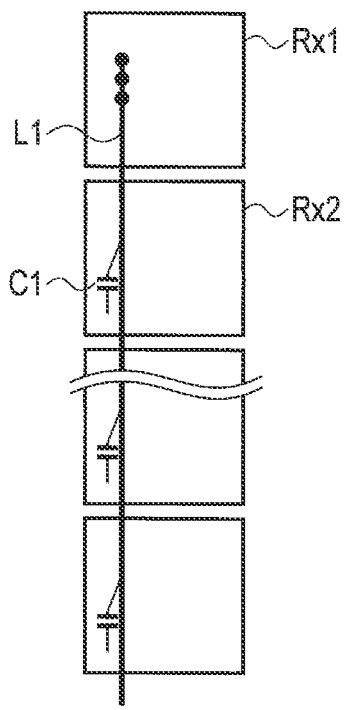
F I G. 12

DISPLAY DEVICE

CROSS-REFERENCE TO RELATED APPLICATIONS

This application is a continuation of U.S. application Ser. No. 16/363,162 filed Mar. 25, 2019, and which is based upon and claims the benefit of priority from Japanese Patent Application No. 2018-065081 filed Mar. 29, 2018, the entire contents of each of which are incorporated herein by reference.

FIELD

Embodiments described herein relate generally to a display device.

BACKGROUND

In recent years, display devices with a touch sensor which detects approaching or contacting of an object with respect to the display device are put in practical use. For example, a display device which comprises a touch sensor not only in a display area which displays images, but also in a peripheral region of the display area has been proposed.

Here, in a touch sensor in which sensor electrodes are arranged in a matrix, a difference in time constant is created between sensor electrodes due to a difference in length of line between sensor wiring lines connected to the respective sensor electrodes, which may cause degrading of detection performance.

BRIEF DESCRIPTION OF THE DRAWINGS

FIG. 11 is a diagram showing a case where four sensor wiring lines L1 are connected to a sensor electrode Rx1.

FIG. 12 is a diagram showing a case where one sensor wiring line L1 is connected to a sensor electrode Rx1.

DETAILED DESCRIPTION

Figure 1:
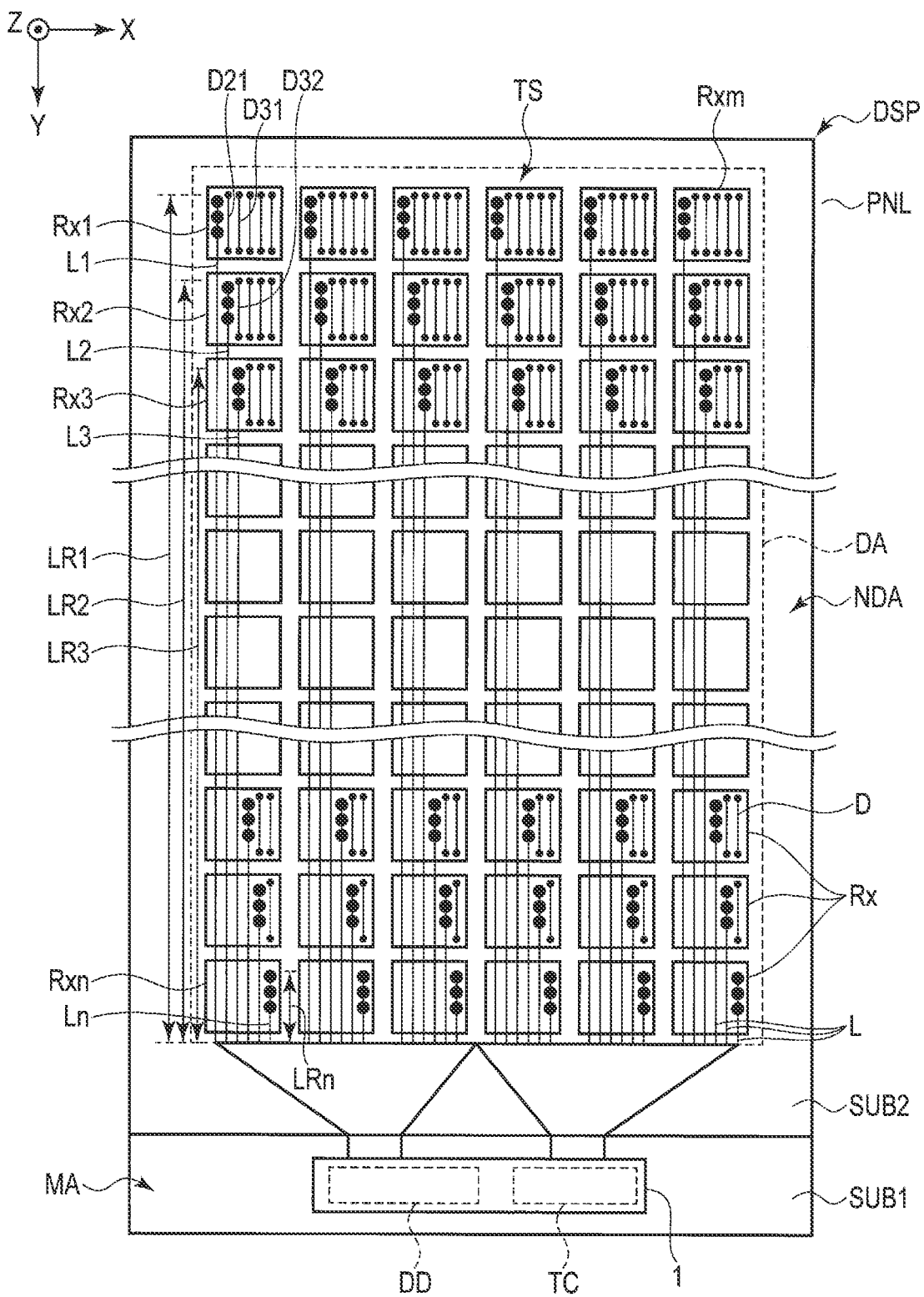
FIG. 1 is a plan view showing a configuration example of a display device DSP of an embodiment.

In general, according to one embodiment, a display device comprises a first electrode, a second electrode spaced from the first electrode, a first wiring electrically connected to the first electrode, a second wiring electrically connected to the second electrode, and a controller electrically connected to the first wiring and the second wiring, wherein the first electrode and the second electrode are located in a display area, the first electrode is connected to the first wiring in a position away from the controller than the second electrode, the second electrode is connected to the second wiring in a position closer to the controller than the first electrode, and a number of the first wiring is greater than a number of the second wiring.

According to another embodiment, a display device comprises a first electrode, a second electrode spaced from the first electrode, a first wiring electrically connected to the first electrode and a second wiring electrically connected to the second electrode, wherein the first electrode and the second electrode are located in a display area, a wiring length of the first wiring is greater than a wiring length of the second wiring, the first wiring intersects the first electrode and the second electrode, and the second wiring intersects the second electrode.

According to another embodiment, a display device comprises a display area, a non-display area surrounding the display area, a controller disposed in the non-display area, a first wiring and a second wiring electrically connected to the controller and arranged along a first direction in the display area, a first electrode disposed in the display area, and a second electrode disposed in the display area, and spaced from the first electrode along a second direction intersecting the first direction, wherein the second electrode is closer to the controller than the first electrode, the first electrode intersects the first wiring, and is electrically connected to the first wiring via a contact portion, and the second electrode intersects the first wiring and the second wiring, and is electrically connected to the second wiring via a contact portion.

The embodiments will be described hereinafter with reference to the accompanying drawings. Note that the disclosure is presented for the sake of exemplification, and any modification and variation conceived within the scope and spirit of the invention by a person having ordinary skill in the art are naturally encompassed in the scope of invention of the present application. In addition, in some cases, in order to make the description clearer, the widths, thicknesses, shapes, etc., of the respective parts are schematically illustrated in the drawings as compared to the actual modes. However, the schematic illustration is merely an example, and adds no restrictions to the interpretation of the invention. Moreover, in the specification and drawings, the structural elements, which have functions identical or similar to the functions described in connection with preceding drawings, are denoted by like reference numbers, and an overlapping detailed description thereof is omitted unless otherwise necessary.

FIG. 1 is a plan view showing a configuration example of a display device DSP of one of the embodiments. For example, a first, direction X, a second direction Y and a third direction Z are orthogonal to each other, but they may cross each other at an angle other than 90 degrees. The first direction X and the second direction Y correspond to the directions parallel to the surface of a substrate which constitutes the display device DSP, and the third direction Z corresponds to the thickness direction of the display device DSP. In this specification, the position by the side of the tip of the arrow which shows the third direction Z is referred to as "up", and the position by the opposite side to the tip of the arrow is referred to as "down". Further, such expressions as "a second member above a first member" and "a second member below a first member" are used to mean that the second member may be in contact with the first member or may be separated from the first member. Moreover, assuming that an observation position from which the display device DSP is to be observed is located in the pointing end side of the arrow indicating the third direction Z, a view from this observation position toward an X-Y plane defined by the first direction X and the second direction Y is referred to as a plan view.

Here, a plan view of the display device DSP in the X-Y plane is shown. The display device DSP comprises a display panel PNL and an IC chip 1. The display panel PNL comprises a first substrate SUB1, a second substrate SUB2 and a touch sensor TS. The first substrate SUB1 and the second substrate SUB2 overlap each other in plan view. The display panel PNL comprises a display area DA which displays images and a frame-like non-display area NDA which surrounds the display area DA. The touch sensor TS and the display area DA are located in a region where the first substrate SUB1 and the second substrate SUB2 overlap each other. In the example illustrated, the touch sensor TS is provided in the display area DA, but it may be provided also in the non-display area NDA.

The first substrate SUB1 includes a mounting portion MA extending in the second direction Y further from the second substrate SUB2. The IC chip 1 is connected to the mounting portion MA. Note that the IC chip 1 may be connected to the flexible printed circuit connected to the mounting portion MA. The IC chip contains a display driver DD and a touch controller TC, built therein. In the display mode for displaying images, the display driver DD outputs signals required for image display, such as video signals, to the display panel PNL. In the touch sensing mode which detects approaching or contacting of an object with respect to the display device DSP, the touch controller TC controls the touch sensor TS. Note that the touch controller TC may be built in an IC chip different from that of the display driver DD.

Here, the touch sensor TS will be described in connection with the case where it is of a self-capacitive type, but the touch sensor TS may be of a mutual capacitive type. The touch sensor TS comprises a plurality of sensor electrodes Rx and a plurality of sensor wiring lines L. The sensor electrodes Rx are located in the display area DA, and are arranged in a matrix along in the first direction X and the second direction Y. In the example illustrated, m sensor electrodes Rx are arranged along the first, direction X at intervals, and n sensor electrodes Rx are arranged along the second direction Y at intervals. Note that m and n are integers greater than or equal to 2 and, for example, n is larger than m. One sensor electrode Rx constitutes a sensor block, which is a minimum unit capable of touch sensing. The sensor wiring lines L each extend along the second direction Y in the display area DA, and are arranged along the first direction X. Each of the sensor wiring lines L is provided in a position overlapping, for example, a respective one of the signal lines S, which will be described later. Further, each of the sensor wiring lines L is drawn out to the non-display area NDA and is electrically connected to the IC chip 1, and further is electrically connected to the touch controller TC inside the IC chip 1.

Here, the relationship between the sensor wiring lines L1 to L3 arranged along the first direction X, and the sensor electrodes Rx1 to Rx3 arranged along the second direction Y will be focused. The sensor electrode Rx1 is disposed at a position furthermost from the touch controller TC among the sensor electrodes Rx located in the display area DA. The sensor wiring line L1 intersects n sensor electrodes Rx and extends to a position overlapping the sensor electrode Rx1 to be electrically connected to the sensor electrode Rx1.

The sensor electrode Rx2 is disposed at a position on a side closer to the touch controller TC than the sensor electrode Rx1. The sensor wiring line L2 intersects n-1 sensor electrodes Rx, and extends to a position overlapping the sensor electrode Rx2 to be electrically connected to the sensor electrode Rx2. The sensor wiring line L2 does not intersect the sensor electrode Rx1.

The sensor electrode Rx3 is disposed at a position on a side closer to the touch controller TC than the sensor electrode Rx2. The sensor wiring line L3 intersects n-2 sensor electrodes Rx, and extends to a position overlapping the sensor electrode Rx3, to be electrically connected to the sensor electrode Rx3. The sensor wiring line L3 does not intersects the sensor electrode Rx1 or Rx2.

The sensor wiring line L1 has a wiring length LR1, the sensor wiring line L2 has a wiring length LR2, and the sensor wiring line L3 has a wiring length LR3. The wiring lengths LR1 to LR3 are lengths all taken along the second direction Y in the display area DA. The wiring length LR1 is greater than the wiring length LR2, and the wiring length LR2 is greater than the wiring length LR3.

The sensor electrode Rxn is disposed at a position closest to the touch controller TC among the sensor electrodes Rx located in the display area DA. The sensor wiring line Ln extends to a position overlapping the sensor electrode Rxn, and is electrically connected to the sensor electrode Rxn. The sensor wiring line Ln does not intersect those other than sensor electrodes Rx located further away with respect to the sensor electrode Rxn. The sensor wiring line Ln has the least wiring length LRn of the sensor wiring lines L.

The dummy wirings D are disposed to correspond to the sensor electrodes Rx, respectively. For example, the dummy wiring D21 is spaced from the sensor wiring line L2. The dummy wiring D21 is disposed to correspond to the sensor electrode Rx1, and is electrically connected to the sensor electrode Rx1. The sensor wiring line L2 and the dummy wiring D21 are located on the same signal line, as will be described later.

The dummy wiring D31 is disposed to correspond to the sensor electrode Rx1, and is electrically connected to the sensor electrode Rx1. The dummy wiring D32 is spaced from the dummy wiring D31 and the sensor wiring line L3. The dummy wiring D32 is disposed to correspond to the sensor electrode Rx2, and is electrically connected to the sensor electrode Rx2. The sensor wiring line L3 and the dummy wirings D31 and D32 are located on the same signal line.

In the touch sensing mode, the touch controller TC applies sensor drive voltage to the sensor wiring line L. Thus, the sensor drive voltage is applied to the sensor electrode Rx, and the touch-sensing operation is performed by the sensor electrode Rx. The sensor signal corresponding to the sensing result in the sensor electrode Rx is output to the touch controller TC via the respective sensor wiring line L. The touch controller TC or an external host detects approaching or contacting/non-contacting of an object to the display device DSP, and position coordinates of the object based on the sensor signal.

Note that in the display mode, the sensor electrode Rx functions as a common electrode CE to which common voltage (Vcom) is applied. The common voltage is applied via the sensor wiring line L from a voltage supply portion contained, for example, in the display driver DD.

Figure 2A:
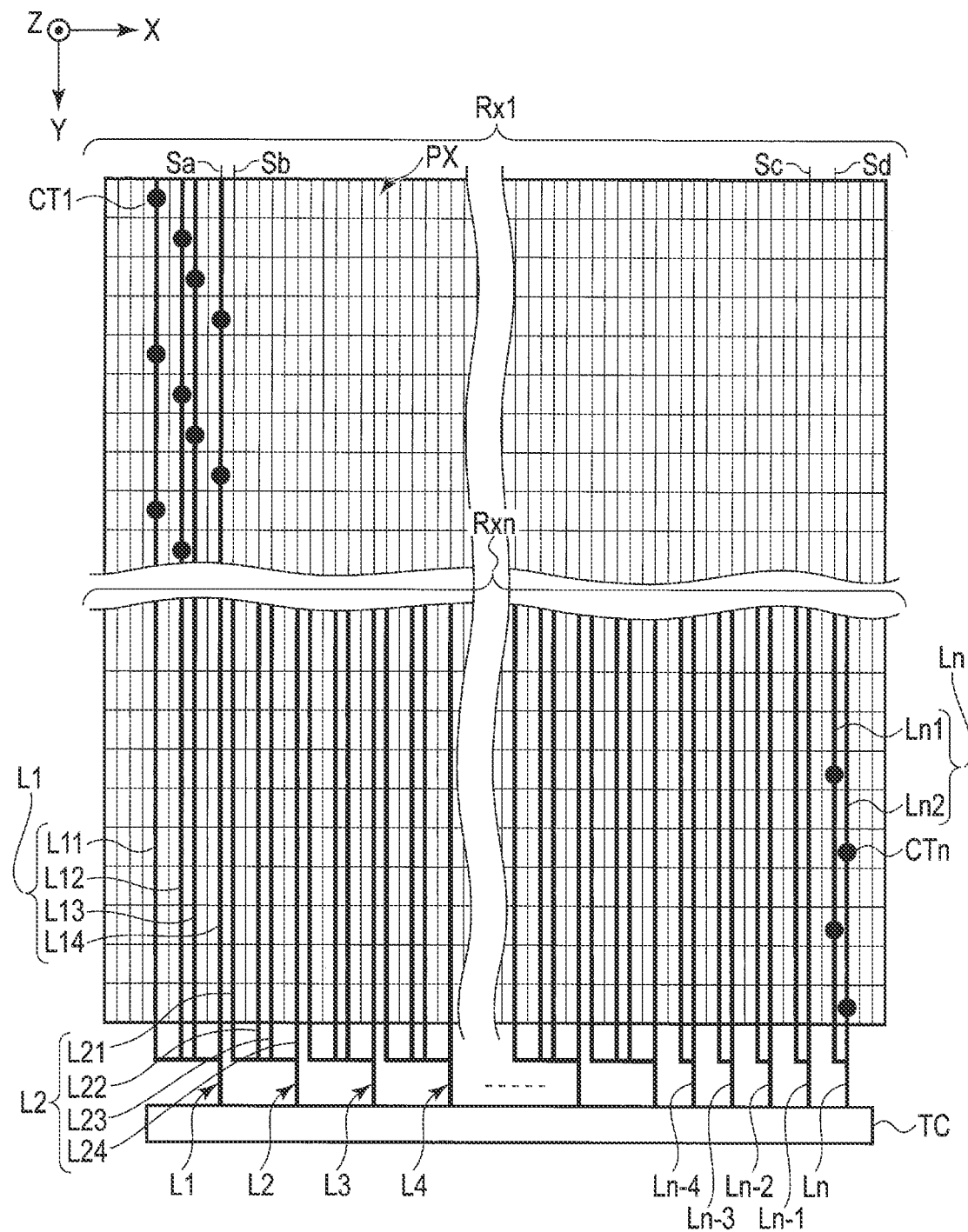
FIG. 2A is a plan view showing how sensor electrodes Rx and sensor wiring lines L shown in FIG. 1 are connected to each other.

FIG. 2A is a plan view illustrating how sensor electrodes Rx and sensor wiring lines L shown in FIG. 1 are connected in relation to each other. In the example illustrated, how the sensor electrode Rx1 and the sensor wiring line L1 are connected in relation to each other and how the sensor electrode Rxn and the sensor wiring line Ln are connected are shown. As described before, the sensor electrode Rx1 is located further away from the touch controller TC than the sensor electrode Rxn. Grids shown in FIG. 2 each illustrate a pixel PX. Each of the sensor wiring lines L1 and Ln is disposed between a respective adjacent pair of pixels PX located along the first direction X. The number of sensor wiring lines L1 or Ln is at least one, and in the example illustrated, the number of sensor wiring lines L1 is greater than that of the sensor wiring line Ln. For example, the sensor wiring lines L1 consist of four sensor wiring lines L11 to L14, and the sensor wiring lines Ln consist of two sensor wiring lines Ln1 and Ln2. Note that the number of the sensor wiring lines L1 or Ln is not limited to that of the example illustrated.

As in the case of the sensor wiring line L1, the sensor wiring lines L2, L3, . . . , consist of four sensor wiring lines. As in the case of the sensor wiring line Ln, the sensor wiring lines Ln-1, Ln-2, Ln-3 and Ln-4 consist of two sensor wiring lines. The number of contact portions CT1 which electrically connect the sensor electrodes Rx1 and the sensor wiring lines L1 respectively to each other is greater than the number of contact portions CTn which electrically connect the sensor electrodes Rxn and the sensor wiring lines Ln respectively to each other. A state in which there are more contact portions CT1 than contact portions CTn can be obtained by applying at least one of the following configurations (A) and (B).

(A) The number of contact portions CT1 per one sensor wiring line L1 is greater than that of contact portions CTn per one sensor wiring line Ln.

(B) The number of contact portions CT1 per one sensor wiring line L1 is less than that of contact portions CTn per one sensor wiring line Ln, but the number of the sensor wiring lines L1 is greater than that of the sensor wiring lines Ln.

In the example shown in FIG. 2A, the sensor electrode Rx1 is equivalent to a first electrode, the sensor electrode Rxn is equivalent to a second electrode, the sensor wiring lines L1 are equivalent to first wirings, the sensor wiring lines Ln are equivalent to second wirings, and the touch controller TC is equivalent to a controller.

Figure 2B:
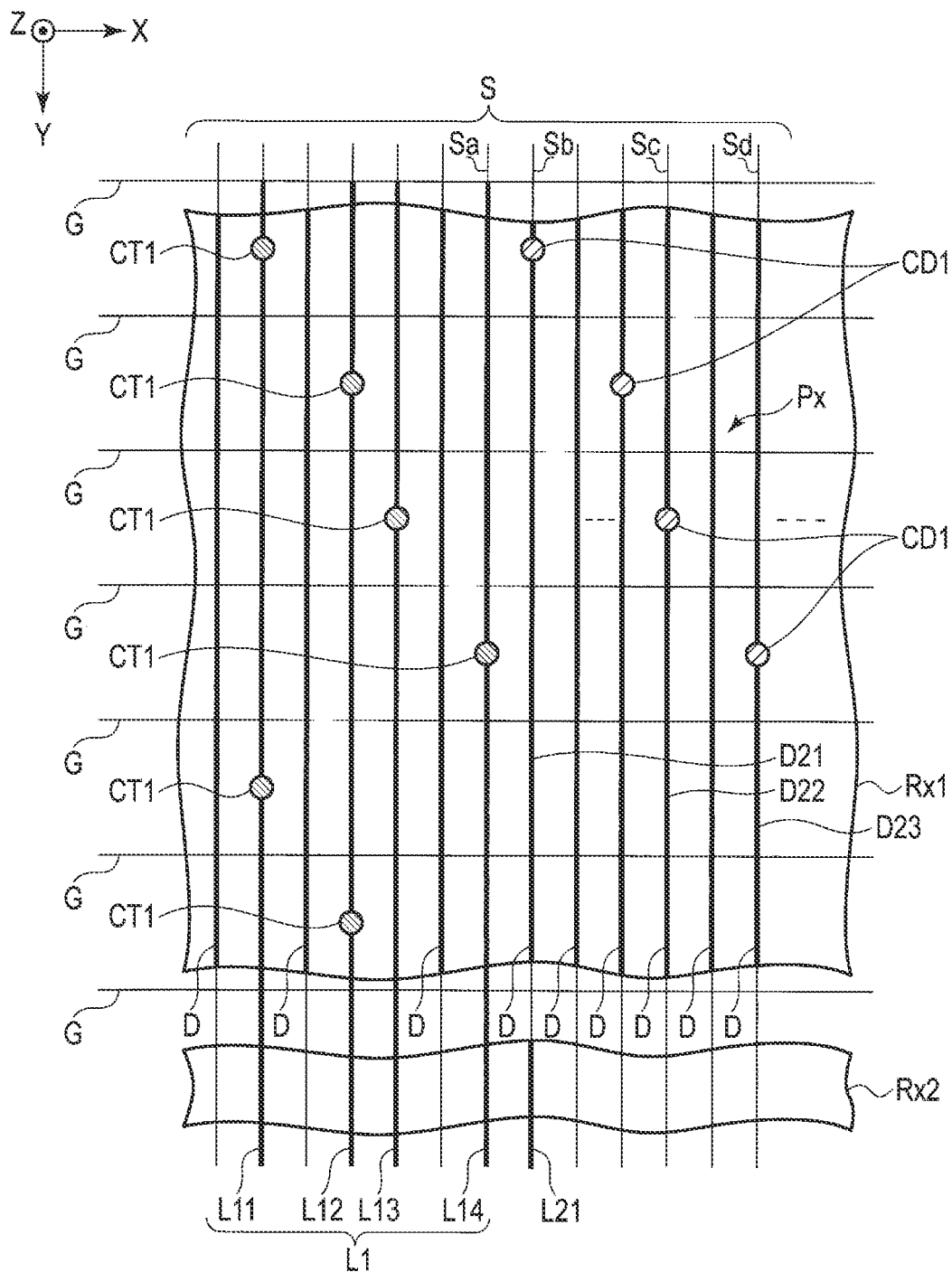
FIG. 2B is a plan view showing how sensor electrodes Rx1 and sensor wiring lines L1 shown in FIG. 2A are connected to each other.

FIG. 2B is a plan view illustrating how the sensor electrode Rx1 and the sensor wiring lines L1 shown in FIG. 2A are connected in relation to each other. A plurality of signal lines S are arranged along the first direction X at intervals. A plurality of scanning lines G are arranged along the second direction Y at intervals. Each pixel PX is surrounded by a respective adjacent pair of scanning lines G and a respective adjacent pair of signal lines S.

In the region corresponding to the sensor electrode Rx1, the sensor wiring lines L1 and dummy wirings D are arranged such that either one of these overlaps any of the signal lines S. As described above, one of the sensor wiring lines L1 and the sensor electrode Rx1 are electrically connected to each other by at least one contact portion CT1. One of the dummy wirings D and the sensor electrode Rx1 are electrically connected to each other by at least one contact portion CD1.

The signal lines S are disposed to correspond to respectively the sensor electrode Rx1 to the sensor electrode Rxn shown in FIG. 2A. FIG. 2A illustrates typical signal lines Sa, Sb, Sc and Sd of the signal lines S.

Here, the signal line Sa is focused. As shown in FIG. 2B, the sensor wiring line L14 overlaps the signal line Sa. Further, as can be seen in FIG. 2A, the sensor wiring line L14 overlaps the entire signal line Sa in a range from the sensor electrode Rx1 to the sensor electrode Rxn.

Now, the signal line Sb is focused. The dummy wiring D21 disposed to correspond to the sensor electrode Rx1 overlaps the signal line Sb. Similarly, the sensor wiring line L21 disposed to correspond to the sensor electrode Rx2 overlaps the signal line Sb. Note that the dummy wiring D21 is spaced from the sensor wiring line L21.

Figure 2C:
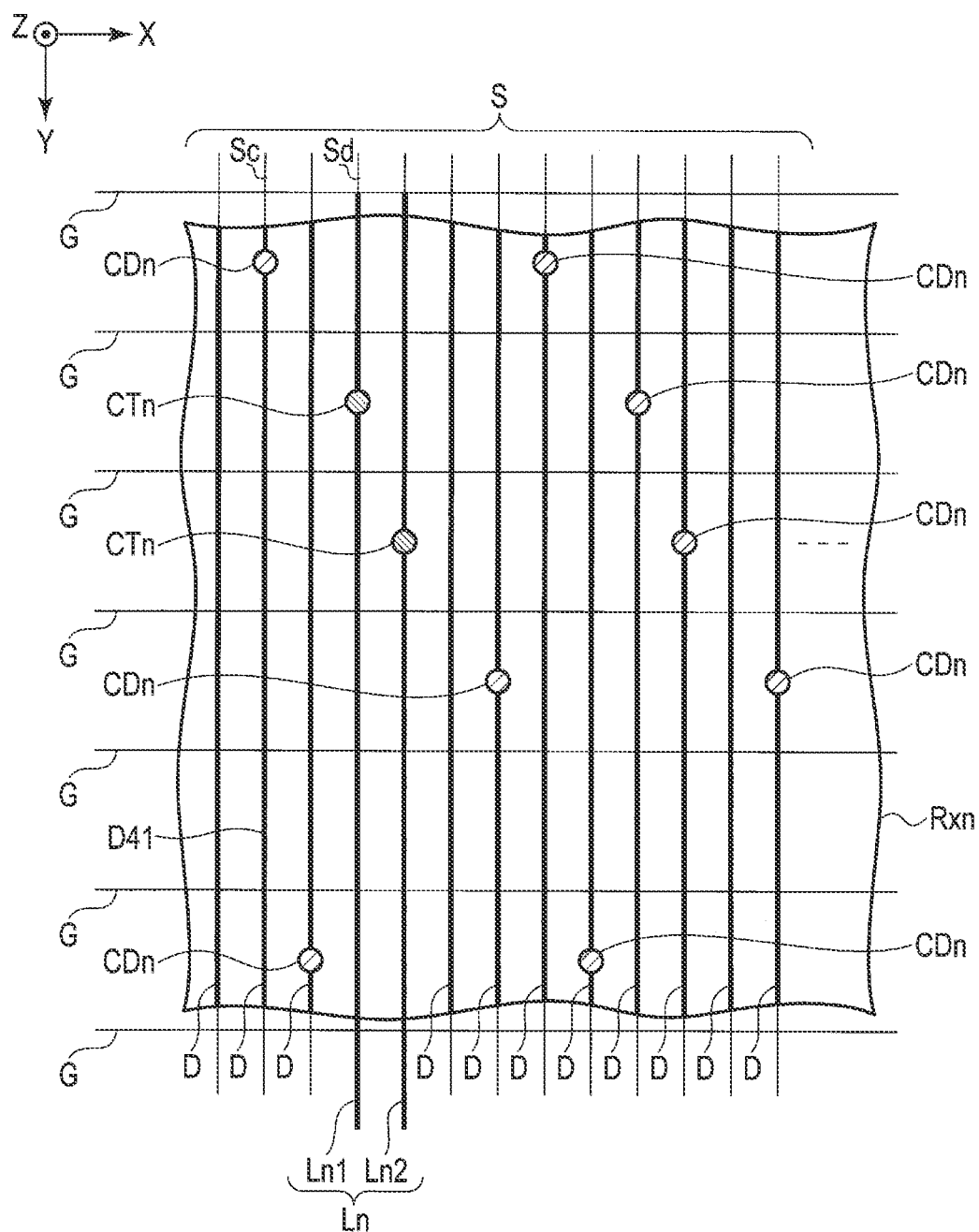
FIG. 2C is a plan view showing how sensor electrodes Rxn and sensor wiring lines Ln shown in FIG. 2A are connected to each other.

FIG. 2C is a plan view illustrating how the sensor electrode Rxn and the sensor wiring lines Ln shown in FIG. 2A are connected in relation to each other. In the region corresponding to the sensor electrode Rxn, any of the sensor wiring lines Ln or the dummy wirings D overlap any of the signal lines S. As described above, one sensor wiring line Ln and the sensor electrode Rxn are electrically connected to each other by at least one contact portion CTn. One dummy wiring D and the sensor electrode Rxn are electrically connected to each other by at least one contact portion CDn. As shown in FIGS. 2B and 2C, the number of contact portions CD1 is less than that of contact portions CDn.

Now, the signal line Sc is focused. The dummy wiring D22 disposed to correspond to the sensor electrode Rx1 and the dummy wiring D41 disposed to correspond to the sensor electrode Rxn both overlap the signal line Sc. Note that the dummy wiring D22 is spaced from the dummy wiring D41. Now, the signal line Sd is focused. The dummy wiring D23 disposed to correspond to the sensor electrode Rx1 and the sensor wiring line Ln1 disposed to correspond to the sensor electrode Rxn both overlap the signal line Sd. Note that the dummy wiring D23 is spaced from sensor wiring line Ln1.

In the example shown in FIG. 2A or 2C, the dummy wirings D21 to D23 are equivalent to first dummy wirings, the dummy wiring D41 is equivalent to a second dummy wiring, the signal line Sa is equivalent to a first signal line, the signal line Sc is equivalent to a second signal line, and the signal line Sd is equivalent to a third signal line.

As described above, in the touch sensor TS comprising matrix-like sensor electrodes Rx, the sensor electrode Rx1 is located further away from the touch controller TC as compared to the sensor electrode Rxn, and the wiring length LR1 of the sensor wiring line L1 electrically connected to the sensor electrode Rx1 is greater than the wiring length LRn of the sensor wiring line Ln electrically connected to the sensor electrode Rxn. Therefore, the time constant of the sensor electrode Rx1 tends to increase from the time constant of the sensor electrode Rxn. Further, as the sensor electrode Rx1 and the sensor electrode Rxn separate from each other to increase the distance therebetween, the difference between both the time constants tends to increase, which may cause variations in the detection performance of the touch sensor TS.

According to this embodiment, the number of contact portions CT1 between the sensor electrode Rx1 and the sensor wiring line L1 is greater than the number of contact, portions CTn between the sensor electrode Rxn and the sensor wiring line Ln. For this reason, as compared with the case where the number of contact portions CT1 is the same as that of contact portions CTn, the difference in time constant between the sensor electrode Rx1 and the sensor electrode Rxn can be reduced. Therefore, the degradation in the detection performance of the touch sensor TS can be suppressed.

Figure 3:
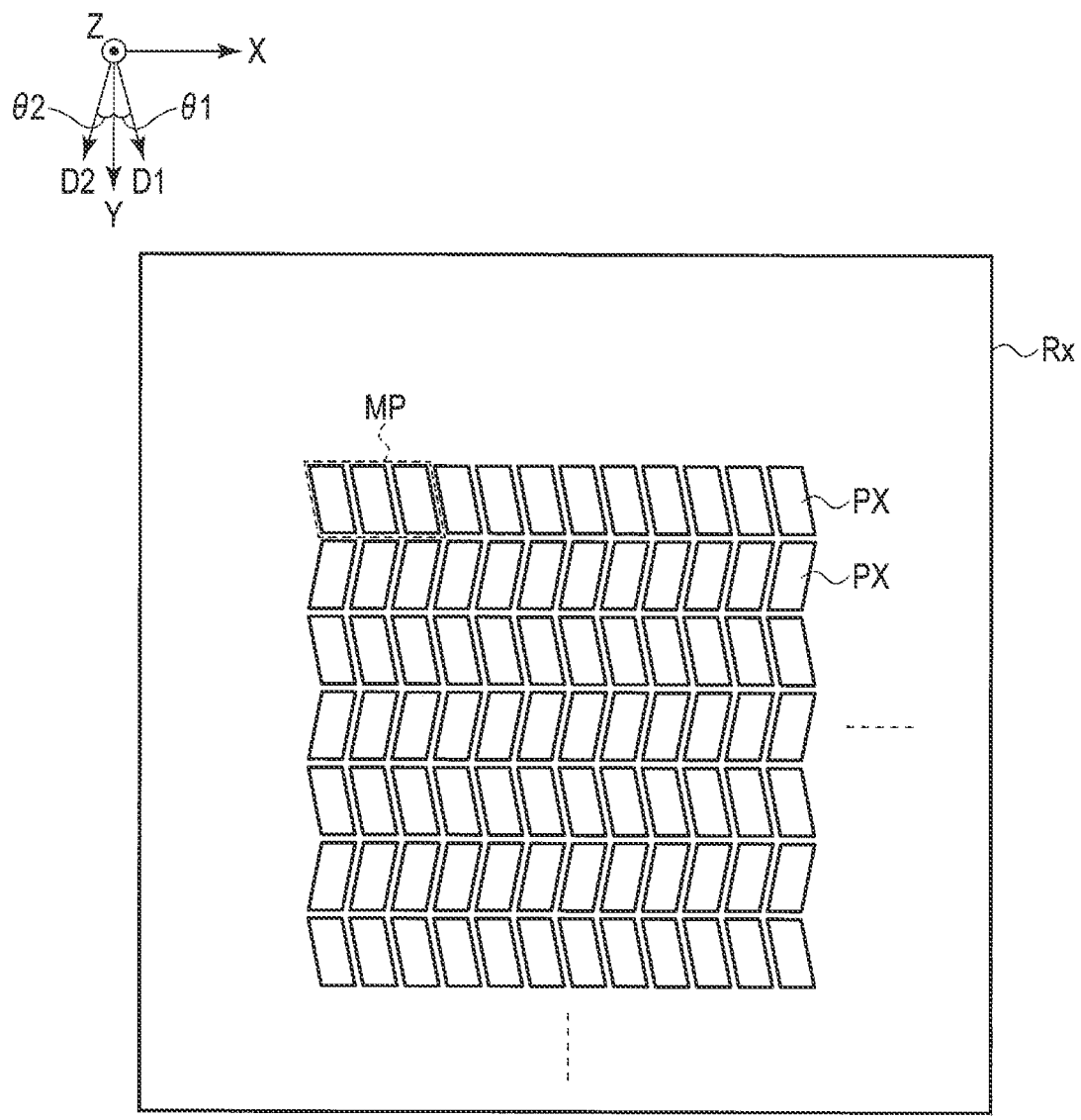
FIG. 3 is a plan view showing a sensor electrode Rx shown in FIG. 1.

FIG. 3 is a plan view showing a sensor electrode Rx shown in FIG. 1. In FIG. 3, a direction which intersects counter-clockwise to the second direction Y at an acute angle is defined as a direction D1, and a direction which intersects clockwise to the second direction Y at an acute angle is defined as a direction D2. Note that an angle θ1 made between the second direction Y and the direction D1 is substantially the same as an angle θ2 made between the second direction Y and the direction D2.

One sensor electrode Rx is disposed over a plurality of pixels PX. In the example illustrated, pixels PX located on odd-numbered lines along the second direction Y extend along the direction D1, and pixels PX located on even-numbered line along the second direction Y extend along the direction D2. Note that the term "pixel PX" used here indicates a minimum unit which is individually controllable by video signals, and may be referred to a subpixel as well. Moreover, a minimum unit for realizing color display may be referred to as a main pixel MP. A main pixel comprises a plurality of sub-pixels PX which exhibit different colors from each other. For example, the main pixel MP comprises, as subpixels PX, a red pixel which displays red, a green pixel which displays green, and a blue pixel which displays blue. Note that the main pixel MP may comprise a white pixel which displays white.

In one sensor electrode Rx, for example, sixty to seventy main pixels MP are arranged along the first direction X, and sixty to seventy main pixels MP are arranged along the second direction.

Figure 4:
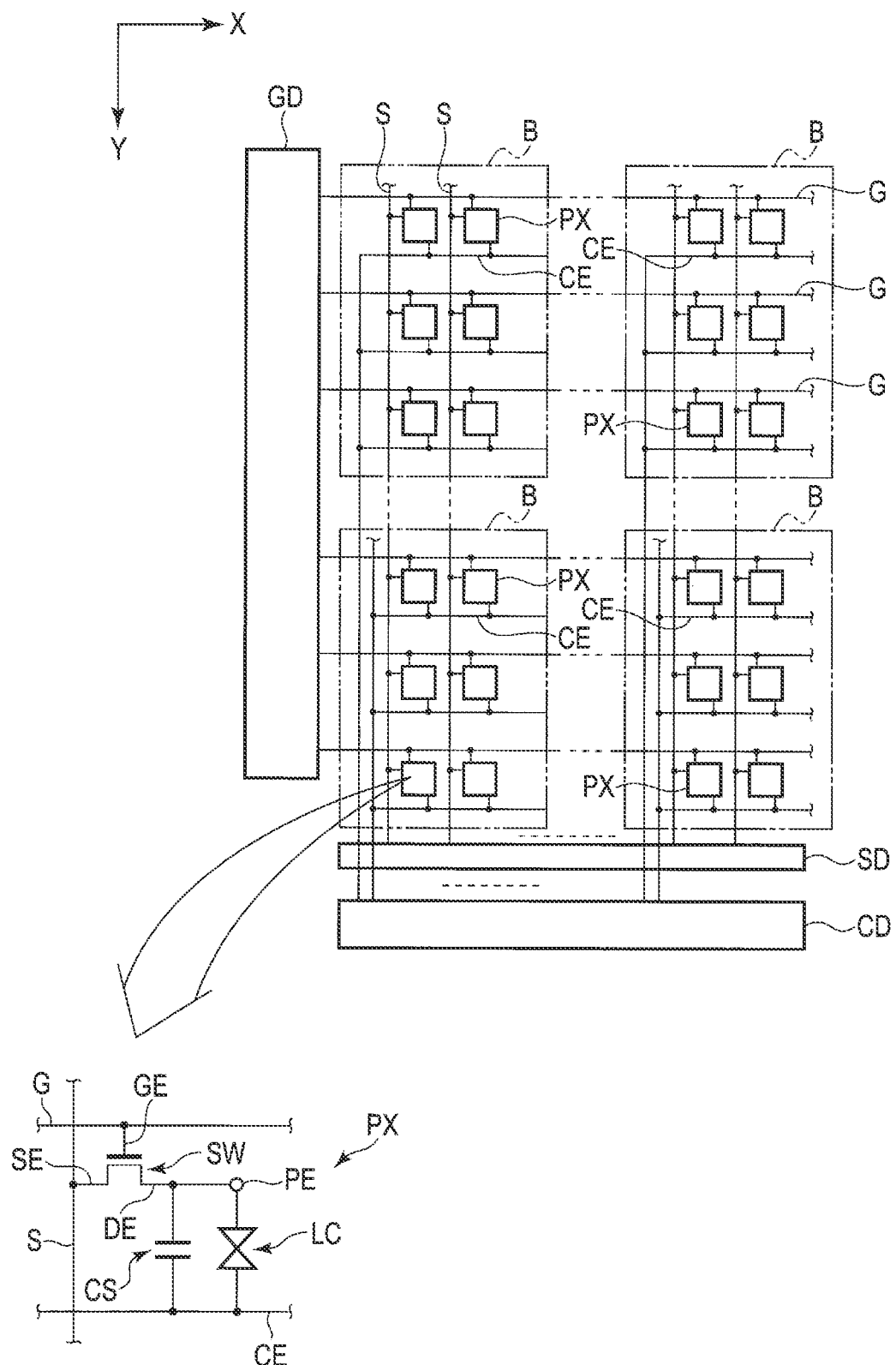
FIG. 4 is a diagram showing a basic configuration and an equivalent circuit of a pixel PX.

FIG. 4 is a diagram illustrating a basic configuration of pixels PX and an equivalent circuit of each thereof. The scanning lines G are connected to a scanning line drive circuit GD. The signal lines S are connected to a signal line drive circuit SD. The scanning lines G and the signal lines S may not necessarily extend linearly, but part of the lines may be bent. For example, the signal lines S are formed to extend along the second direction Y even if they are partially bent.

The common electrode CE is provided in each of the sensor blocks B. The common electrode CE is connected to the voltage supply portion CD at common voltage (Vcom), and are arranged over a plurality of pixels PX. Moreover, the common electrodes CE are connected also to the touch controller TC as described above, and they function also as sensor electrodes Rx.

Each pixel PX comprises a switching element SW, a pixel electrode PE, a common electrode CE, a liquid crystal layer LC and the like. The switching element SW is constituted by a thin-film transistor (TFT), for example, and is electrically connected to the respective scanning line G and the respective signal line S. Each scanning line G is connected to a gate electrode of the switching element SW in each respective one of the pixels PX arranged in the first direction X. Each signal line S is connected to a source electrode of the switching element SW in each respective one of the pixels PX arranged in the second direction Y. Each pixel electrode PE is electrically connected to the respective switching element SW. Each pixel electrode PE is provided to oppose the respective common electrode CE, and drives the liquid crystal layer LC by an electric field produced between the pixel electrode PE and the common electrode CE. A storage capacitor CS is formed, for example, between an electrode at the same potential as that of the common electrode CE and an electrode at the same potential as that of the pixel electrode PE.

Figure 5:
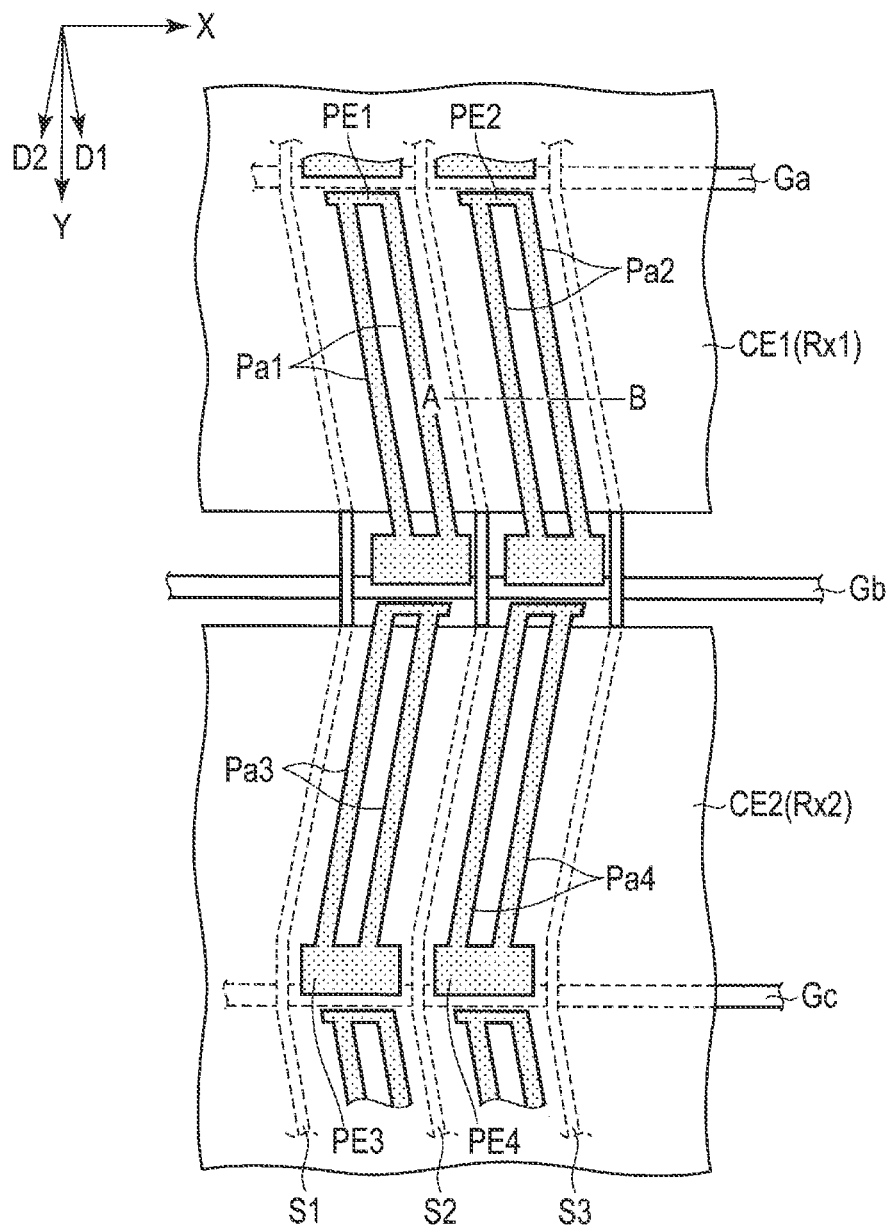
FIG. 5 is a plan view showing an example of layout of pixels.

FIG. 5 is a plan view showing an example of layout of the pixels. Here, an expanded view is provided to show the layout in a region formed over the sensor electrodes Rx1 and Rx2 shown in FIG. 1. That is, let us suppose here that the common electrode CE1 illustrated here is equivalent to the sensor electrode Rx1, and the common electrode CE2 is equivalent to the sensor electrode Rx2. Scanning lines Ga, Gb and Gc each extend linearly along the first direction X, and also arranged along the second direction Y at intervals. The signal lines S1 to S3 extend substantially along the second direction Y, and are arranged at intervals along the first direction X.

The pixel electrodes PE1 and PE2 are disposed between the scanning lines Ga and Gb. The pixel electrodes PE1 and PE2 are arranged along the first direction X. The pixel electrodes PE3 and PE4 are disposed between the scanning lines Gb and Gc. The pixel electrodes PE3 and PE4 are arranged along the first direction X. The pixel electrodes PE1 and PE3 are disposed between the signal lines S1 and S2, and the pixel electrodes PE2 and PE4 are disposed between the signal lines S2 and S3.

The pixel electrodes PE1 and PE2, respectively, include strip electrodes Pa1 and Pa2 extending along the direction D1. The pixel electrodes PE3 and PE4, respectively, include strip electrodes Pa3 and Pa4 extending along the direction D2. In the example illustrated, the number of strips in each of the electrodes Pa1 to Pa4 is two, but it may be one or three or more.

The common electrodes CE1 and CE2 are equivalent respectively to the sensor electrodes Rx1 and Rx2 shown in FIG. 1. The common electrode CE1 overlaps the scanning line Ga and the signal lines S1 to S3. The pixel electrodes PE1 and PE2 overlap the common electrode CE1. The common electrode CE2 overlaps the scanning line Gc and the signal lines S1 to S3. The pixel electrodes PE3 and PE4 overlap the common electrode CE2. The common electrode CE2 is spaced from the common electrode CE1, and they are electrically insulated from each other. In the example illustrated, the scanning line Gb is located between the common electrodes CE1 and CE2. Similarly, the other common electrodes or other sensor electrodes overlap a plurality of pixel electrodes.

Figure 6:
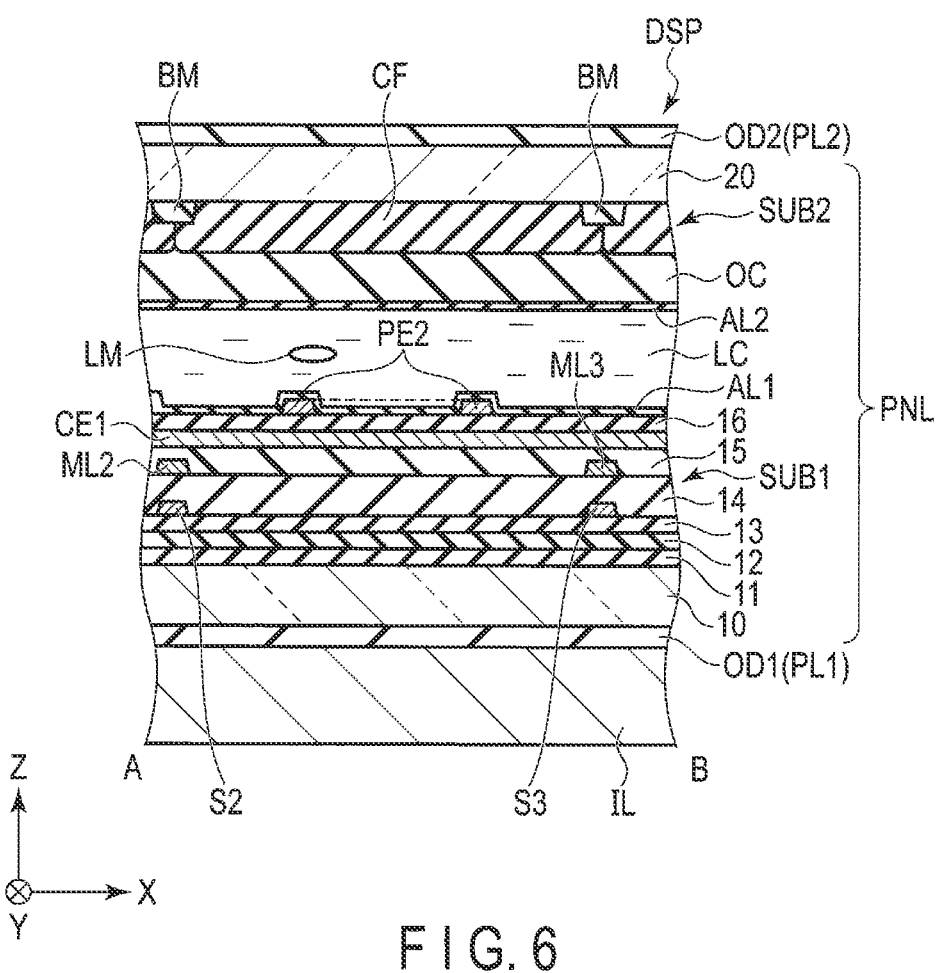
FIG. 6 is a cross section of a display device DSP taken along line A-B shown in FIG. 5.

FIG. 6 is a cross section of the display device DSP taken along line A-B shown in FIG. 5. The example illustrated is equivalent to a case where a fringe-field switching (FFS) mode, which is one of the display modes which utilize a lateral electric field, is applied. The display device DSP comprises a display panel PNL, optical elements OD1 and OD2 and an illumination unit IL. The illumination unit IL, the optical element OD1, the display panel PNL, and the optical element OD2 are arranged in this order along the third direction Z. The display panel PNL comprises a first substrate SUB1, a second substrate SUB2 and a liquid crystal layer LC.

The first substrate SUB1 comprises an insulating substrate 10, insulating films 11 to 16, signal lines S2 and S3, metallic wiring lines ML2 and ML3, and a common electrode CE1, a pixel electrode PE2, an alignment film AL1 and the like. The first insulating substrate 10 is a light-transmissive substrate such as a glass substrate or a flexible resin substrate. The insulating films 11 to 13 are arranged on the insulating substrate 10 in this order along the third direction Z.

The signal lines S2 and S3 are located on the third insulating film 13 and covered by the fourth insulation film 14. Note that the signal lines S2 and S3 are located in the same layer as that of the other signal lines S1, which are not shown. The signal lines S2 and S3 are formed of a metal material such as aluminum (Al), titanium (Ti), silver (Ag), molybdenum (Mo), tungsten (W), copper (Cu) or chromium (Cr), or an alloy of any combinations of these metal materials, and they may be of a single- or multi-layered structure. For example, the signal lines S2 and S3 are of a layered body in which titanium (Ti), aluminum (Al) and titanium (Ti) are stacked one on another in order.

The metallic wiring line ML2 and ML3 are located on the insulating film 14, and are covered by the insulating film 15. The metallic wiring line ML2 is located immediately above the signal line S2, and the metallic wiring line ML3 is located immediately above the signal line S3. The metallic wiring line ML2 and ML3 are formed of a metal material listed above or an alloy described above, and they may be of a single- or multi-layered structure. For example, the metallic wiring line ML2 and ML3 are layered bodies in which titanium (Ti), aluminum (Al) and titanium (Ti) are stacked in order, or molybdenum (Mo), aluminum (Al) and molybdenum (Mo) are stacked in order. The metallic wiring lines ML2 and ML3 are equivalent to those of the sensor wiring lines and dummy wirings, described above.

The common electrode CE1 is located on the insulating film 15 and covered with the insulating film 16. The common electrode CE is formed of a transparent conductive material such as indium tin oxide (ITO) or indium zinc oxide (IZO). The pixel electrode PE2 is located on the insulating film 16 and is covered by the first alignment film AL1. The pixel electrode PE2 is formed of a transparent, electrically conductive material such as ITO or IZO.

The insulating films 11 to 13 and the insulating film 16 are inorganic insulating films each formed of an inorganic insulating material such as silicon oxide, silicon nitride or silicon oxynitride, and may be of a single- or a multi-layer structure. The insulating films 14 and 15 are organic insulating films each formed of, for example, an organic insulating material such as acrylic resin. Note that the insulating film 15 may be an inorganic insulating film.

The second substrate SUB2 comprises an insulating substrate 20, light-shielding layers BM, color filters CF, an overcoat layer OC, an alignment film AL2 and the like.

As in the case of the first insulating substrate 10, the second insulating substrate 30 is a light-transmissive substrate such as a glass substrate or a resin substrate. The light-shielding layers BM and the color filters CF are located on a side of the second insulating substrate 20, which opposes the first substrate SUB1. The color filters CF are arranged at positions opposing the pixel electrode PE, and they partially overlap the respective light-shielding layers BM. The color filters CF include those of red, green and blue. The overcoat layer OC covers the color filters CF. The overcoat layer OC is formed of a transparent resin. The alignment film AL2 covers the overcoat layer OC. The first alignment film AL1 and the second alignment film AL2 are formed of, for example, a material which exhibits horizontal alignment properties. The first substrate SUB1 and the second substrate SUB2 described above are disposed such that the first alignment film AL1 and the second alignment film AL2 oppose each other.

The liquid crystal layer LC is located between the first substrate SUB1 and the second substrate SUB2, and held between the alignment film AL1 and the alignment film AL2. The liquid crystal layer LQ contains liquid crystal molecules LM. The liquid crystal layer LC comprises a positive-type (the dielectric constant anisotropy thereof being positive) liquid crystal material or a negative-type (the dielectric constant anisotropy being negative) liquid crystal material.

The optical element OD1 including a polarizer PL1 is adhered to the insulating substrate 10. The optical element OD2 including a polarizer PL2 is adhered to the insulating substrate 20. Note that the optical element OD1 and optical element OD2 each may comprise a retardation film, a scattering layer, an antireflective layer, etc., if needed.

In the display panel PNL with such a structure as described above, the liquid crystal molecules LM are initially aligned along a predetermined direction between the alignment film AL1 and the alignment film AL2 in an OFF state where no electric field is produced between the pixel electrode PE2 and the common electrode CE1. In the OFF state, light irradiated towards the display panel PNL from the illumination unit IL is absorbed by optical element OD1 and the optical element OD2, creating dark display. On the other hand, in an ON state where an electric field is produced between the pixel electrode PE2 and the common electrode CE1, the liquid crystal molecules LM are aligned along a direction different from that of the initial alignment by the electric field, and the direction of alignment is controlled by the electric field. In the ON state, part of light from the illumination unit IL passes through the optical elements OD1 and OD2, creating bright display.

Figure 7:
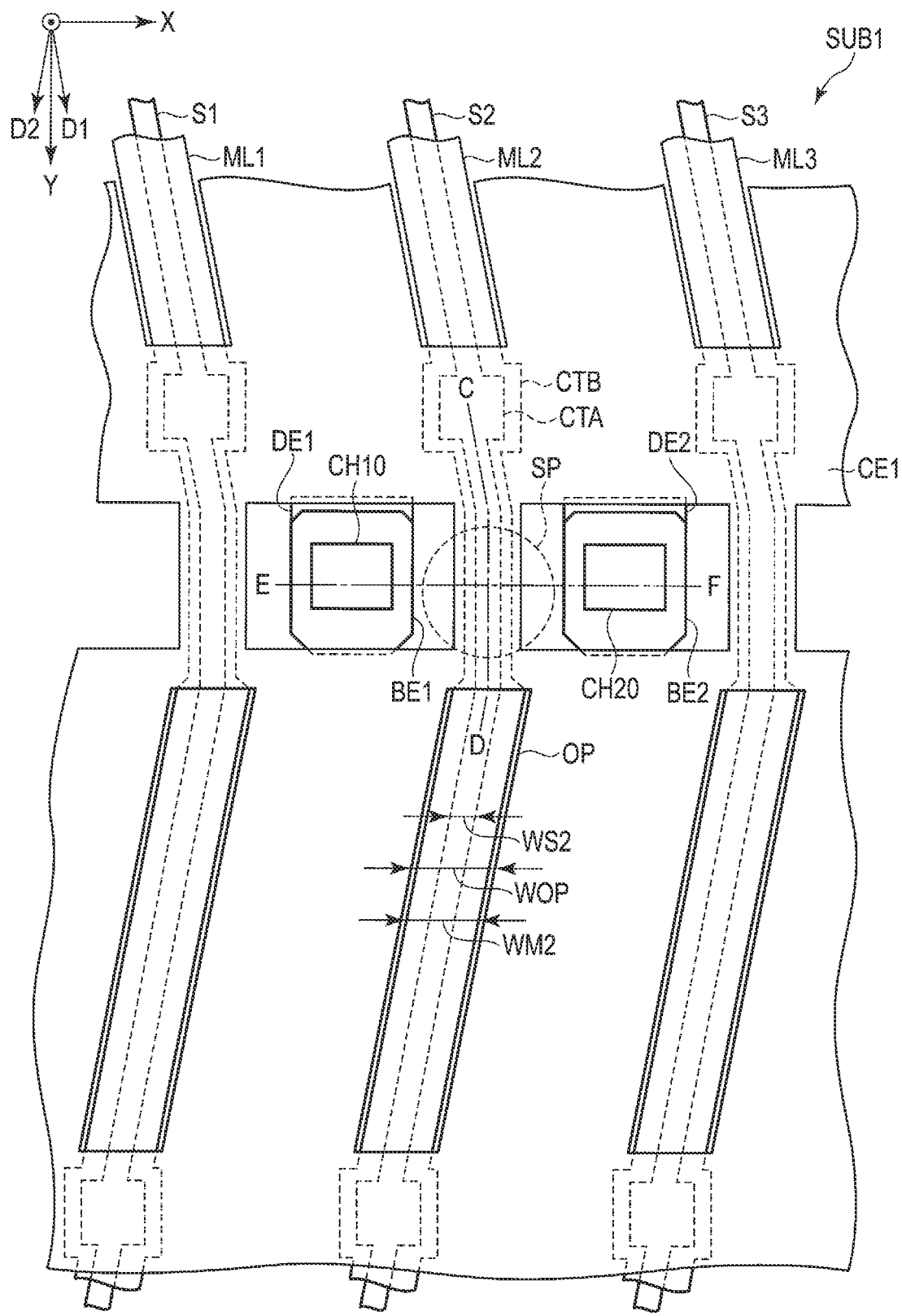
FIG. 7 is an enlarged plan view showing a main part of a first substrate SUB1.

FIG. 7 is an enlarged plan view illustrating the main part of the first substrate SUB1. Here, the scanning lines, pixel electrodes, semiconductor layer, etc., are omitted from the illustration. The first substrate SUB1 further comprises drain electrodes DE1 and DE2 and connection electrodes BE1 and BE2. Each of the signal lines S1 to S3 includes, in a respective position overlapping the common electrode CE1, a portion extending along the direction D1, a portion extending along the direction D2, and a portion extending along the second direction Y. The metallic wiring line ML1 to ML3 overlap the signal lines S1 to S3, respectively. The metallic wiring lines ML1 to ML3 are arranged along the first direction X at intervals.

The drain electrodes DE1 and DE2 are each formed into an island-like shape. The drain electrode DE1 is disposed between the signal lines S1 and S2, and the drain electrode DE2 is disposed between the signal lines S2 and S3. The drain electrodes DE1 and DE2 are located in the same layer as that of the signal line S2 and the like, and are formed of the same material as that of the signal line S2.

The connection electrodes BE1 and BE2 are each formed into an island-like shape. The connection electrode BE1 overlaps the drain electrode DE1, and the connection electrode BE2 overlaps the drain electrode DE2. The connection electrode BE1 is in contact with the drain electrode DE1 via a contact hole CH10. The connection electrode BE2 is in contact with the drain electrode DE2 through a contact hole CH20. The connection electrodes BE1 and BE2 are located in the same layer as that of the metallic wiring line ML2 or the like, and are formed of the same material as that of the with metallic wiring line ML2.

Here, the signal line S2 and the metallic wiring line ML2 will be focused. For example, the metallic wiring line ML2 is equivalent to one of the sensor wiring line L11 and the dummy wirings D shown in FIG. 2B. The signal line S2 includes a contact portion CTA in contact with a semiconductor layer, which will be described later. The contact portion CTA extends further from the other wiring portions in the first direction X. The metallic wiring line ML2 includes a contact portion CTB in contact with the common electrode CE1. The contact portion CTB overlaps the contact portion CTA. When the metallic wiring line ML2 is equivalent to the sensor wiring line L11, the contact portion CTB is equivalent to the contact portion CT1 shown in FIG.

2B. When the metallic wiring line ML2 is equivalent to the dummy wiring D21, the contact portion CTB is equivalent to the contact portion CD1 shown in FIG. 2B.

The common electrode CE1 includes an opening OP which overlaps the metallic wiring line ML2. The opening OP illustrated here is a slit extending along the direction D2. The opening OP has a width WOP. The metallic wiring line ML2 has a width WM2 in a position overlapping the opening OP. The width WM2 is less than the width WOP. The metallic wiring line ML2 is located in an inner section of the opening OP. The signal line S2 has a width WS2. The width WS2 is less than the width WM2. The signal line S2 is located on an inner section of the metallic wiring line ML2. Note that the term "width" used in this specification is equivalent to the length taken along the first direction X. The common electrode CE1 includes similar openings OP also in regions overlapping the other metallic wiring lines ML1 and ML3. As to the other common electrodes CE (or sensor electrodes Rx), similarly, openings OP are formed in respective parts of the regions overlapping the metallic wiring lines ML (or the sensor wiring lines L and the dummy wirings D).

As indicated by a dotted line in the drawing, a spacer SP is located between the connection electrodes BE1 and BE2, and overlaps the common electrode CE1.

Figure 8:
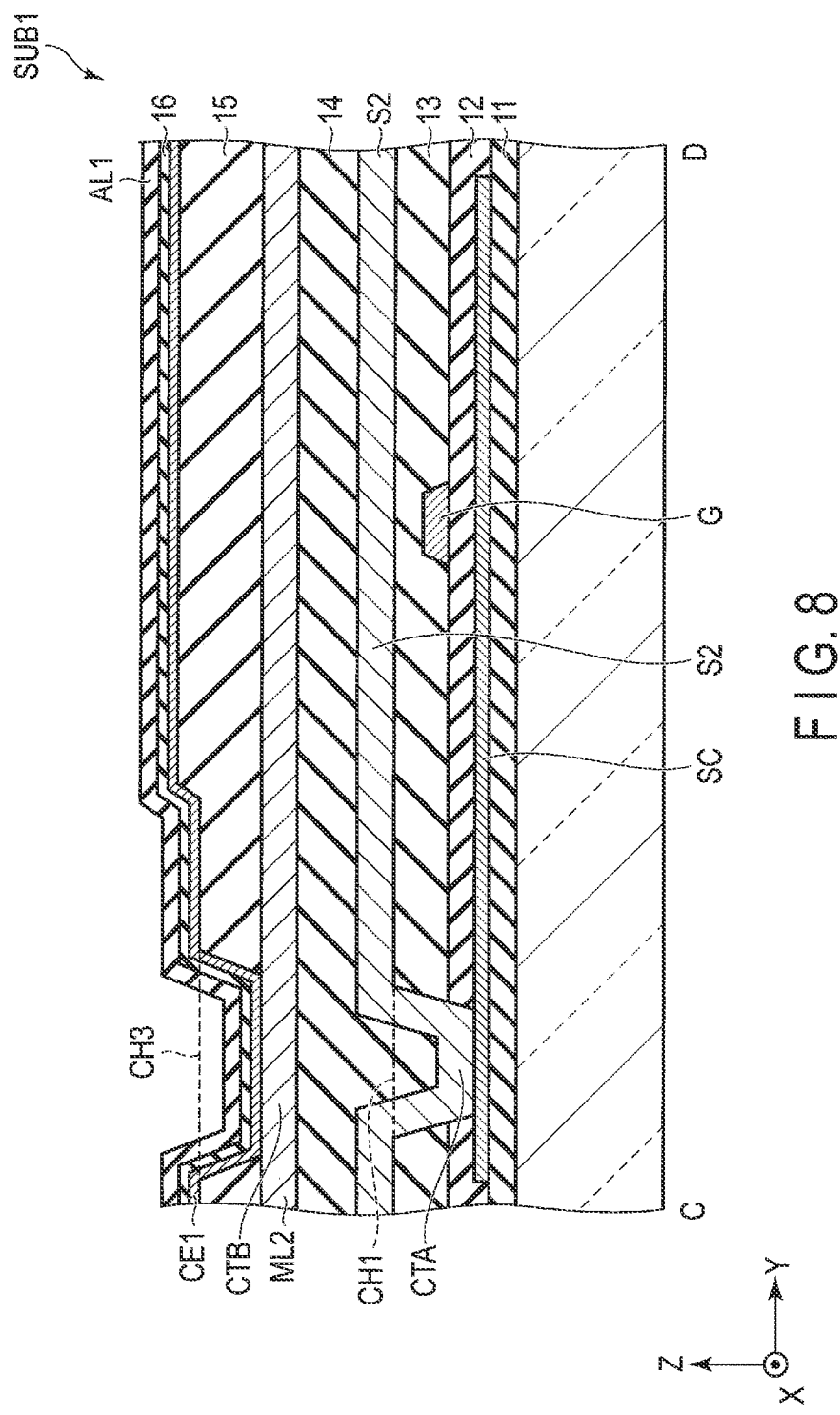
FIG. 8 is a cross-section of the first substrate SUB1 taken along line C-D shown in FIG. 7.

FIG. 8 is a cross section of the first substrate SUB1 taken along line C-D shown in FIG. 7. The first substrate SUB1 further comprises a semiconductor layer SC, scanning lines G and the like. The semiconductor layer SC is located on the insulating substrate 11, and is covered by the insulating film 12. The semiconductor layer SC is formed of, for example, polycrystalline silicon, but may be formed of amorphous silicon, an oxide semiconductor or the like. The scanning lines G are formed on the insulating film 12 and are covered by the insulation film 13. The scanning lines G are formed using a metal material listed above.

The contact portion CTA of the signal line S2 is in contact with the semiconductor layer SC1 via the contact hole CH11 which penetrates the insulating film 12 and the insulating film 13. The metallic wiring line ML2 is located on the insulating film 14 and is covered by the insulating film 15. The contact portion CTB of the metallic wiring line ML2 is in contact with the common electrode CE1 via a contact hole CH3 which penetrates the insulating film 15.

Figure 9:
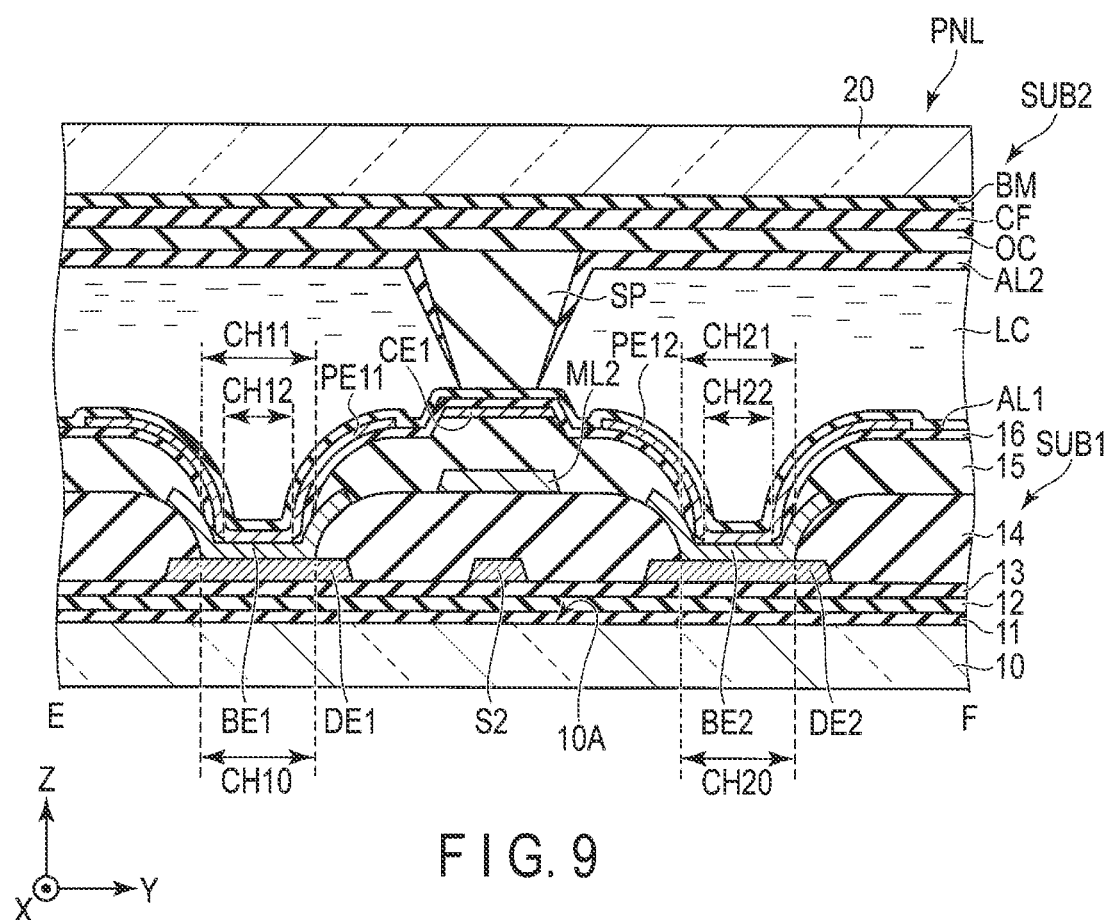
FIG. 9 is a cross-section of a display panel PNL taken along line E-F in FIG. 7.

FIG. 9 is a cross section of the display panel PNL taken along line E-F shown in FIG. 7. The connection electrode BE1, the metallic wiring line ML2 and the connection electrode BE2 are arranged in this order along the second direction Y at intervals, and they are located in the same layer. The connection electrode BE1 is in contact with the drain electrode DE1 via a contact hole CH10 which penetrates the insulating film 14. The connection electrode BE2 is in contact with drain electrode DE2 via a contact hole CH20 which penetrates the insulating film 14.

The pixel electrodes PE1 and PE2 are disposed on the insulating film 16 and are covered by the alignment film AL1. The pixel electrode PE11 is located immediately above the connection electrode BE1, and is in contact with the connection electrode BE1 via a contact hole CH11 which penetrates the insulating film 15 to the connection electrode BE1 and a contact hole CH12 which penetrate the insulating film 16 to the connection electrode BE1. Similarly, the pixel electrode PE12 is located immediately above the connection electrode BE2, and is in contact with the connection electrode BE2 via a contact hole CH21 which penetrates the insulating film 15 and a contact hole CH22 which penetrate the insulating film 16.

The spacer SP is provided in the second substrate SUB2. The spacer SP is located between the first substrate SUB1 and the second substrate SUB2 and forms a cell gap between the first substrate SUB1 and the second substrate SUB2. The cell gap is, for example, 2 to 5 μm. The spacer SP is formed of, for example, a resin material. In the first substrate SUB1 immediately below the spacer SP, the signal line S2, the insulating film 14, the metallic wiring line ML2, the insulating film 15, the common electrode CE1, the insulating film 16 and the alignment film AL1 are stacked in this order along the third direction Z. Note that in immediately below the signal line S2, a semiconductor layer is disposed between the insulating films 11 and 12, but is omitted from the illustration.

Figure 10:
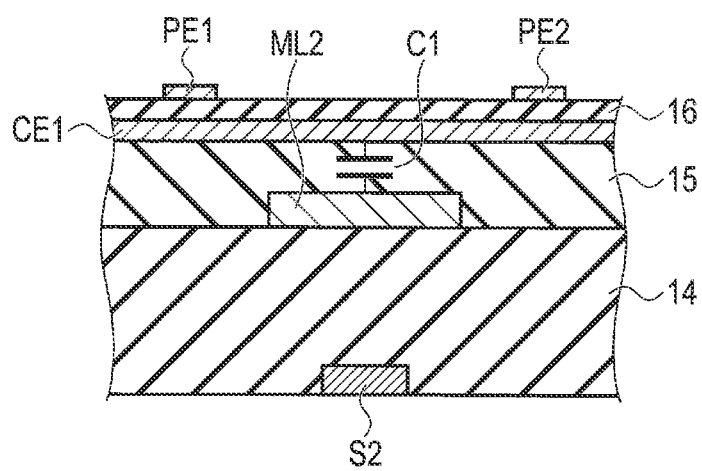
FIG. 10 is a diagram illustrating a capacitor C1 between a common electrode CE1 and a metallic wiring line ML2.

FIG. 10 is a diagram illustrating a capacitor C1 between the common electrode CE1 and the metallic wiring line ML2. As shown, when the common electrode CE1 overlaps the metallic wiring line ML2 via the insulating film 15, the capacitor C1 is produced. The capacitance of the capacitor C1 is decreased as the thickness of the insulating film 15 is reduced. Moreover, the capacitance of the capacitor C1 is decreased as the dielectric constant of the insulating film 15 is lower. In consideration of these points, the capacitance of the capacity C1 can be decreased when the insulating film 15 is a relatively thick organic insulating film.

FIG. 11 is a diagram showing the case where four sensor wiring lines L1 are connected to the sensor electrode Rx1, and FIG. 12 showing the case where one sensor wiring line L1 is connected to the sensor electrode Rx1. As described above, as one measure to reduce the time constant of the sensor electrode Rx1 located further away from the touch controller TC, there is a technique of increasing the number of sensor wiring lines L1 to be connected to the sensor electrode Rx1. However, as compared to the case where there is one sensor wiring line L1 as in the example shown in FIG. 12, when there are four sensor wiring lines L1 as in the example shown in FIG. 11, the part overlapping sensor electrodes other than the sensor electrode Rx1 increases, and thus the capacitance of the capacity C1 increases. For this reason, the capacitance of the capacity C1 increases as the number of sensor wiring lines L1 increases, thus possibly disabled to fully exhibit the effect of reducing the time constant.

According to this embodiment, as described with reference to FIG. 7, the common electrode CE1 includes the opening OP which overlaps the metallic wiring line ML2. With this structure, the capacitance of the capacity C1 between the common electrode CE1 and the metallic wiring line ML2 can be reduced. Therefore, even if the number of sensor wiring lines L1 to be connected to the sensor electrode Rx1 located far away from the touch controller TC, the increase in the capacitance of the capacitor C1 can be inhibited, thereby making it possible to obtain the effect of reducing the time constant.

As described above according to the embodiment, a display device which can suppress degradation of the detection performance can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The display panel PNL of this embodiment is not limited to the transmissive type with the transmissive display function which displays images by selectively transmitting light from a rear surface side of the first substrate SUB1, but may be the reflective type with the reflective display function which displays images by selectively reflecting light from a front surface side of the second substrate SUB2, or a transreflective type with both the transmissive display function and the reflective display function.

Moreover, the embodiment is described in connection with the display panel PNL provided for the display mode using a lateral electric field along the main surface of the substrate. But, the embodiment is not limited to this, and it may be a display panel provided for any of a display mode using a vertical electric field along the normal of the main surface of the substrate, a display mode using an inclined electric field inclined along an oblique direction to the main surface of the substrate, and a display mode using a combination of a lateral electric field, a vertical electric field and an inclined electric field in any way. Note that the main surface of the substrate is a surface parallel to the X-Y plane.

What is claimed is:

1. A display device comprising:
scanning lines extending in a first direction;
a first signal line and a second signal line extending in a second direction crossing the first direction;
a first metal wiring overlapping the first signal line and a second metal wiring overlapping the second signal line;
a first pixel electrode and a second pixel electrode arranged along the second direction;
a common electrode including a first electrode opposed to the first pixel electrode and a second electrode opposed to the second pixel electrode; and
a controller which supplies signals to the first and second signal lines and the first and second metal wirings, wherein
the second electrode is separated from the first electrode in the second direction and is closer to the controller than the first electrode,
the first metal wiring overlaps the first electrode and the second electrode in a plan view and is connected to the first electrode via first contact portions,
the second metal wiring overlaps the second electrode in the plan view and is connected to the second electrode via second contact portions, and
a number of the first contact portions is different from a number of the second contact portions.

2. The display device of claim 1, wherein the second wiring does not overlap the first electrode.

3. The display device of claim 1, wherein the second electrode is not connected to the first metal wiring.

4. The display device of claim 1, wherein the number of the first contact portions is greater than the number of the second contact portions.

5. The display device of claim 1, further comprising:
a first dummy wiring overlapping the first electrode in the plan view; and
a second dummy wiring overlapping the second electrode in the plan view,
wherein
a number of contact portions between the first electrode and the first dummy wiring is different from a number of contact portions between the second electrode and the second dummy wiring.

6. The display device of claim 5, wherein the number of contact portions between the first electrode and the first dummy wiring is less than the number of contact portions between the second electrode and the second dummy wiring.

7. The display device of claim 5, wherein the first dummy wiring overlaps the second signal line, and
the first dummy wiring is separated from the second metal wiring.

* * * * *